United States Patent [19]

Chou et al.

[11] Patent Number: 5,366,710
[45] Date of Patent: Nov. 22, 1994

[54] PROCESS FOR REMOVING NITROGEN OXIDES AND SULFUR OXIDES FROM GASEOUS STREAM

[75] Inventors: Charles C. Chou; Chaoliang Yao, both of Houston, Tex.

[73] Assignee: Shell Oil Company, Houston, Tex.

[21] Appl. No.: 59,480

[22] Filed: May 10, 1993

[51] Int. Cl.$^5$ .................. C01B 17/48; C01B 21/20
[52] U.S. Cl. .................. 423/235; 423/242.1; 423/243.01; 423/243.07
[58] Field of Search ............... 423/235, 242.1, 243.01, 423/243.07

[56] References Cited

U.S. PATENT DOCUMENTS

| | | | |
|---|---|---|---|
| 4,100,259 | 7/1978 | Salaun et al. | 423/242 |
| 4,113,840 | 9/1978 | Hanway, Jr. et al. | 423/242 |
| 4,164,545 | 8/1979 | Scott | 423/239 |
| 4,925,569 | 5/1990 | Chou et al. | 210/713 |
| 4,943,422 | 7/1990 | Ledon et al. | 423/242 |

FOREIGN PATENT DOCUMENTS

| | | | |
|---|---|---|---|
| 87107725 | 5/1988 | China . | |
| 1052260 | 6/1991 | China . | |
| 3331376 | 3/1985 | Germany | 423/235 |
| 3731899 | 4/1989 | Germany . | |
| 49-5877 | 1/1974 | Japan | 423/235 |
| 51-136592 | 11/1976 | Japan . | |
| 51-136595 | 11/1976 | Japan . | |
| 54-026966 | 8/1977 | Japan . | |
| 3207427 | 3/1989 | Japan . | |
| 1087163 | 8/1984 | U.S.S.R. | 423/243.01 |

OTHER PUBLICATIONS

"Handbook of Chemistry and Physics" (43rd edition) edited by Hodgman et al. Apr. 1962, Chemical Rubber Publishing Company) Cleveland, Ohio; pp. 604–605.

*Primary Examiner*—Gary P. Straub
*Assistant Examiner*—Timothy C. Vanoy
*Attorney, Agent, or Firm*—Y. Grace Tsang

[57] ABSTRACT

A process for removing $NO_x$ and/or $SO_x$ from a gaseous stream by oxidation with a fine flocculent acidic catalyst slurry which is regenerable during the process, in particular by pH adjustment in the absence of added heat. The catalyst slurry comprises $MnO_2$, $Mn_2O_3$, and $Mn_3O_4$ having pH in the range from about 0.5 to about 6.5 and is prepared by aerating a divalent manganous salt in an aqueous solution having a pH in the range from about 8.0 to about 13.5.

14 Claims, 1 Drawing Sheet

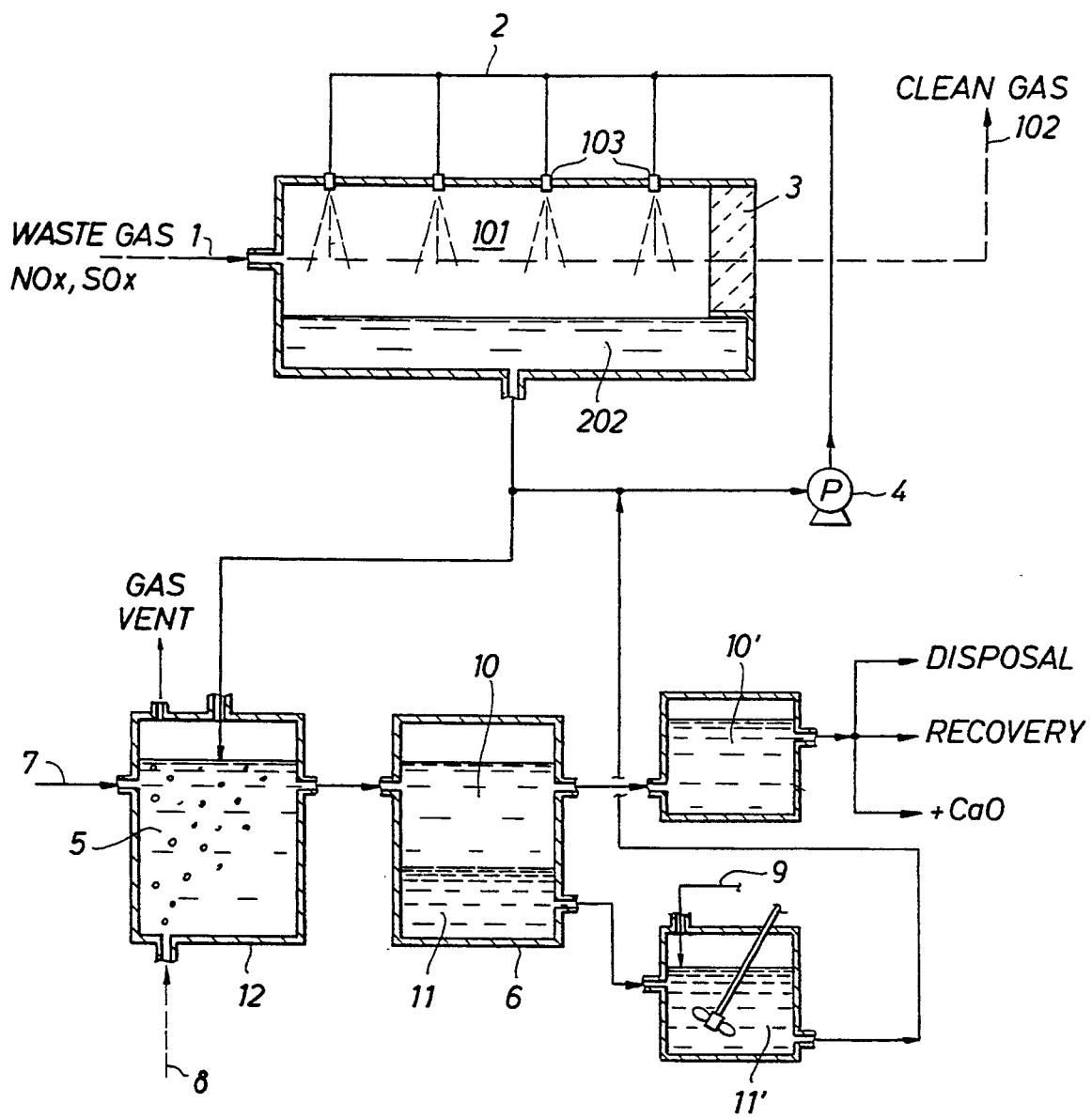

PROCESS FOR REMOVING NITROGEN OXIDES AND SULFUR OXIDES FROM GASEOUS STREAM

FIELD OF THE INVENTION

This invention relates to a process for removing oxides of nitrogen and oxides of sulfur from waste gas by oxidation with a manganese-containing catalyst wherein the manganese-containing catalyst is regenerable during the process.

BACKGROUND OF THE INVENTION

Contamination of the atmosphere by oxides of sulfur ($SO_x$) and oxides of nitrogen ($NO_x$) has been a public health and environmental problem for many years, because of the irritating effect on the human respiratory system, the adverse effect on plant life, and corrosive attack on many metals, fabrics, and building materials. These pollutants are generated from the combustion of sulfur and nitrogen compounds in the fossil fuels, such as oil and coal, and from the high temperature reaction of nitrogen and oxygen gases at the point of combustion, and are subsequently emitted as power plant flue gas, incinerator off-gas, and other waste gas from combustion engine, metallurgical plants, fertilizer plants and chemical plants.

One prior solution to this problem is to utilize wet scrubbing processes which involve washing the flue gas with various scrubbing solutions. Wet scrubbing processes can be effective in removing sulfur dioxide ($SO_2$) and nitrogen dioxide ($NO_2$) from the flue gases. However, nitric oxide (NO) is usually the major $NO_x$ species in waste gases from combustion processes. Due to the extremely low water solubility of nitric oxide (NO), the wet scrubbing processes are ineffective in removing nitric oxide (NO), unless the nitric oxide (NO) is oxidized to nitrogen dioxide ($NO_2$). Gas phase oxidation of NO requires expensive oxidizers such as ozone or chlorine. Reaction-driven scrubbing processes utilizing chelated ferrous salts (e.g. EDTA-Fe (II) solution) to form a covalent Fe-NO bond with nitric oxide have been proposed. However, the presence of 3–5% oxygen in most waste gases tends to oxidize Fe(II) to Fe(III) and thus render these reaction-driven scrubbing processes ineffective unless a reducing agent is also provided. This approach is again economically not viable, unless Fe(II) can be practically regenerated, because the costs of the chemicals used are relatively high.

Another prior art solution to this problem comprises Selective Catalytic Reduction (SCR) of $NO_x$ to nitrogen ($N_2$) with a catalyst and a reducing agent such as urea or ammonia. However, this method is expensive and also ineffective in removing $SO_x$.

One other solution to this problem was proposed in Japanese Patent Application No. 54,026,966 published Feb. 28, 1989. This method comprises contacting the waste stack gas with a solution containing ferric nitrate and ferric sulfate. $SO_x$ is oxidized and dissolved as $FeSO_4$ and $NO_x$ is oxidized to $Fe(NO_3)_2OH$. The drawback for this process is the poor removal of $NO_x$, since ferric nitrate cannot effectively convert NO to $NO_2$ which is more water soluble.

Still another solution to this problem comprises treating waste gas with manganese dioxide ($MnO_2$) to form nitrate ($NO_3^-$) and sulfate ($SO_4^=$), while the manganese (IV) dioxide is reduced to manganous (II) compounds.

There are several patents disclosing the use of manganese dioxide for waste gas treatment. Chinese patent application No. 1,052,260 published Jun. 19, 1991 discloses a process for treating $SO_x$ using a soft Manganese ore containing about 60% $MnO_2$. The Mn(IV) is reduced to Mn(II) and $MnSO_4$ is recovered as a by-product. No manganese regeneration is mentioned. A similar process is disclosed in Japanese patent application No. 3,207,427, published Sep. 10, 1991.

German Patent Application No. 3,731,899, published Apr. 27, 1989, discloses a stepwise removal of $NO_x$ which involves first converting NO to $NO_2$ and subsequently oxidizing $NO_2$ to manganous nitrate by $MnO_2$. Thermal regeneration of $MnO_2$ is mentioned.

U.S. Pat. No. 4,164,545, issued Aug. 14, 1979, described a process for treating waste gas utilizing $MnO_2$ absorbent for $NO_x$ and $SO_x$ removal. The manganous ion formed is then recovered by ion exchange in acidic condition followed by thermal regeneration. This method is again tedious and expensive.

A flue gas wet scrubbing process using $MnO_2$, $KMnO_4$, FeS, and CuO and surfactant as scrubbing medium is described in Chinese Patent Application No. 87,107,725, published May 18, 1988. No regeneration of Manganese is mentioned.

Japanese Patent Application No. 51,136,592 and 51,136,595, both published on Nov. 26, 1976, disclose an anodic deposition method for the regeneration of a $MnO_2$-based catalyst. $MnO_2$ is supported. Complicated dialysis and ion exchange procedures are involved.

U.S. Pat. No. 4,925,569, issued May 15, 1990, discloses a process for reducing the level of sulfides in aqueous solutions and gaseous in the presence of manganese-containing catalyst. There is no mention of removal of nitrogen oxides and sulfur oxides in the reference. There is again no mention of regeneration of manganese oxide.

These prior art processes are either tedious and/or too expensive. Those processes which utilize $MnO_2$ are costly because they either consume large quantities of manganese compounds which are expensive, or the methods for regeneration of the manganese dioxide involve complicated and costly steps, such as thermal regeneration, ion exchange, etc. Since the 1990 Amendment to the Clean Air Act requires more facilities to have $NO_x$ control in addition to $SO_x$ control, there is a need for an improved process which can efficiently remove both $NO_x$ and $SO_x$ simultaneously and with a simple and economic method for the regeneration of the chemicals used.

SUMMARY OF THE INVENTION

This invention relates to a process for removing $NO_x$ (NO, $NO_2$) and/or $SO_x$ ($SO_2$, $SO_3$) from a gaseous stream by oxidation with a fine flocculent acidic catalyst slurry which is regenerable during the process, in particular by pH adjustment in the absence of added heat. The catalyst slurry comprises $MnO_2$, $Mn_2O_3$, and $Mn_3O_4$ having pH in the range from about 0.5 to about 6.5 and is prepared by aerating a divalent manganous salt in an aqueous solution having a pH in the range from about 8.0 to about 13.5. During this process, the $NO_x$ and $SO_x$ in the gaseous stream are oxidized into nitrate and sulfate which are soluble in water. The manganese oxides slurry is reduced to water soluble manganous ion which is regenerated back to a very fine flocculent catalyst slurry comprising $MnO_2$, $Mn_2O_3$, and $Mn_3O_4$ by aeration and raising the pH of the catalyst slurry to a range of 8.0 to 13.5 in the absence of added heat. The catalyst slurry comprising $MnO_2$, $Mn_2O_3$, and $Mn_3O_4$ is stable and insoluble in aqueous solution from pH 1-13 and can be separated from the aqueous nitrate and sulfate and thereafter recycled back to the reaction chamber to be reused for the oxidation of $SO_x$ and $NO_x$. The aqueous sulfate and nitrate solution can either be disposed through a disposal well or be recovered as a by-product.

The invention further provides a process for removing $NO_x$ and $SO_x$ from a gaseous stream by oxidation with a mixture comprising an iron salt and a fine flocculent acidic catalyst slurry comprising $MnO_2$, $Mn_2O_3$, and $Mn_3O_4$ prepared by aerating a divalent manganous salt in an aqueous solution having a pH in the range from 8.0 to 13.5.

BRIEF DESCRIPTION OF THE DRAWINGS

The appended drawing is a schematic diagram contemplating an industrial scale application of the instant process for $SO_x$ and $NO_x$ removal using regenerable manganese oxide catalyst slurry.

A detailed description of the process illustrated by the drawing can be found in the detailed description hereinafter.

Throughout the drawing, the same reference numerals have been used for similar purposes, and accessories such as valves, pumps and control instruments not necessary for the purpose of understanding of the present invention are not all shown.

DETAILED DESCRIPTION OF THE INVENTION

The present invention relates a process for scrubbing gases to remove oxides of nitrogen and sulfur.

The gaseous feed to the instant process will generally be waste gas such as power plant flue gas, incinerator off-gas, and other waste gas from combustion engine, metallurgical plants, fertilizer plants and chemical plants. These waste gases contain oxides of sulfur, oxides of nitrogen and mixtures thereof generated from the combustion of sulfur and nitrogen compounds in the fossil fuels, such as oil and coal, and from the high temperature reaction of nitrogen and oxygen gases at the point of combustion. The instant process will remove either $SO_x$ or $NO_x$ where the waste gas stream contains either one of these two pollutants. Where the waste gas stream contains both of these pollutants, the instant process will effectively remove both $SO_x$ and $NO_x$ simultaneously.

Referring to the appended drawing, the present process is typically initiated by introducing the gaseous feed 1 to the reaction chamber 101, which can be either an absorption reactor, a column or a series of columns. The gaseous feed to the reaction chamber will ordinarily have a temperature from about 20° C. to about 200° C., preferably from about 60° C. to about 140° C., the pressure will typically be from about 0.01 psi to about 100 psi, preferably from about 0.05 psig (pound per square inch gauge) to about 10 psig.

A flocculent catalyst slurry 2 can be introduced to the reaction chamber through fine spray nozzles or atomizer nozzles 103. In the alternative, in a batch process, the reaction chamber can be filled with flocculent catalyst slurry and the gaseous feed is introduced to the reaction chamber via fine bubble diffusers. The flocculent catalyst slurry typically contains from about 0.01M to about 1M, preferably from about 0.05 to about 0.5M of manganese oxides, i.e. $MnO_2$, $Mn_2O_3$, and $Mn_3O_4$ having a pH value in the range from about 0.5 to about 6.5, preferably from about 1.0 to about 2.5. This flocculent catalyst slurry is prepared by contacting, for typically 0.5 to 20 hours, preferably 1 to 10 hours, a divalent manganous salt in an aqueous solution having a pH value from about 8.0 to about 13.5 with an oxygen containing gaseous stream having an oxygen partial pressure in the range from about 0.1 psig to about 300 psig, preferably from about 1 psig to about 15 psig, having a total gas pressure in the range from about 1 psig to about 300 psig, preferably from about 5 psig to about 100 psig, at a temperature typically above the freezing point of the solution, i.e. in the range from about 0° C. to about 200° C., preferably from about 20° C. to about 150° C.

In a preferred embodiment of the present invention, the catalyst slurry is prepared at ambient temperature and ambient pressure by aeration for 1 to 10 hours without adding any heat or pressure. The manganese oxides formed by this method have much greater surface area than a suspension prepared from commercial manganese dioxide and thus provide much higher scrubbing efficiency, especially for $NO_x$. An acid, such as hydrochloric acid or sulfuric acid, is added to the slurry to adjust the catalyst slurry to an acidic pH in the range from about 0.5 to about 6.5. For the removal of $NO_x$, the pH is preferably adjusted to from about 1.0 to about 2.5. The catalyst slurry will have a temperature typically above the freezing point and below the boiling point of the solution, i.e. in the range from about 0° C. to about 100° C., preferably from about 50° C. to about 95° C.

In another preferred embodiment of the present invention, a water soluble iron salt, such as ferrous sulfate, is added to the manganese oxides catalyst slurry as a homogeneous oxidizing mediator. Since Fe(III) is soluble in acidic aqueous solution, it makes better contact with $SO_x$ and $NO_x$ in the gaseous stream than manganese oxides which are insoluble in aqueous solution. As a non-limiting illustrative example, 0.1-10 mM of ferrous sulfate ($FeSO_4$) is added to the manganese oxides slurry. Iron (II) will automatically oxidize to iron(III) in the presence of $MnO_2$, $Mn_2O_3$, and/or $Mn_3O_4$.

After reaction with the catalyst slurry, a substantial portion of the $NO_x$ and $SO_x$ in the gas stream is oxidized to form nitrate ($NO_3^-$) and sulfate ($SO_4^=$) ions which are dissolved in the aqueous catalyst solution with the $MnO_2$, $Mn_2O_3$, and $Mn_3O_4$ being reduced to form manganous (II) ions which are also soluble in the aqueous solution.

The treated gaseous stream having a substantial portion of the $SO_x$ and $NO_x$ removed is optionally passed through a demister 3 and collected as cleaned gas 102.

The used scrubbing catalyst solution 202 containing divalent manganous sulfate and nitrate ions, optionally iron' is drained either continuously or intermittently to a regeneration chamber 12. The catalyst slurry is regenerated by contacting with an oxygen-containing gaseous stream in alkaline condition, and then settled, decanted and acidified for recycling. The oxygen-containing gaseous stream is typically a gaseous stream containing from about 5% to near 100% oxygen ($O_2$). Non-limiting examples of the oxygen-containing gaseous stream include air, oxygen ($O_2$) gas with near 100% purity, and mixtures thereof. Specifically, caustic 7 such as NaOH and KOH is added to the spent catalyst solution 5 to adjust the pH of the solution to a value from about 8.0 to about 13.5. The solution is contacted for typically about 0.5 to 20 hours, preferably 1 to 10 hours, with an oxygen-containing gas stream 8 having an oxygen partial pressure in the range from about 0.1 psig to about 300 psig, preferably from about 1 psig to about 15 psig, having a total gas pressure in the range from about 1 psig to about 300 psig, preferably from about 5 psig to about 100 psig. The gas temperature is above the freezing point of the solution, i.e. typically in the range from about 0° C. to about 200° C., preferably from about 20° C. to about 150° C. In a preferred embodiment of the present invention, the catalyst solution is regenerated at ambient temperature and ambient pressure by aeration for about 1 to 10 hours without applying any heat or pressure. During the regeneration, the color of the solution gradually changes from light brown to almost black which indicates that the manganous(II) ion is gradually changed to manganese oxides (III, IV) which are in the form of insoluble fine flocs having high surface area and thus provide much higher scrubbing efficiency, especially for $NO_x$. The regenerated solution is then settled in a gravity settler 6. The supernatant brine 10 containing sulfate, nitrate such as $NaNO_3$ or $KNO_3$, $Na_2SO_4$ or $K_2SO_4$ is decanted as spent supernatant brine 10'. An acid 9, such as hydrochloric acid or sulfuric acid, is added to the settled slurry 11' to adjust to an acidic pH in the range from about 0.5 to about 6.5, preferably from about 1.0 to about 2.5. This catalyst slurry made of manganese oxide flocs is stable and insoluble in 11' water within the pH range from about 1 to about 13 and will typically have a temperature above the freezing point and below the boiling point of the solution, i.e., in the range from about 0° C. to about 100° C., preferably from about 50° C. to about 95° C. The catalyst slurry will then be recycled back by a pump 4 to reaction chamber 101 to be reused.

The spent supernatant brine 10' is optionally neutralized with an acid, such as hydrochloric acid or sulfuric acid. It can be disposed to a disposal well. Alternatively, the salts in the spent supernatant brine 10' which typically comprises potassium nitrate or sodium nitrate, sodium sulfate or potassium sulfate, etc., can be recovered by concentration and/or evaporation. As another alternative, slaked lime ($Ca(OH)_2$) or lime (CaO) can be added to the spent supernatant brine 10' to generate a high pH alkaline solution comprising NaOH or KOH which can be used for pH adjustment during the instant process. Calcium ion would precipitate sulfate as $CaSO_4$ which can be precipitated by gravity or can be separated by filtration. The formation of alkaline solution by adding slaked lime or lime can be illustrated by the following equation:

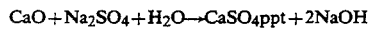

$$CaO + Na_2SO_4 + H_2O \rightarrow CaSO_4 ppt + 2NaOH$$

The solid calcium sulfate precipitates are removed by filtration or precipitation, and the solution which contains sodium hydroxide can then be used for pH adjustment.

The invention will be illustrated by the following illustrative embodiments which are provided for illustration only and are not intended to limit the scope of the instant invention.

Illustrative Embodiments

Part A: Preparation of 0.1M manganese oxides ($MnO_2$, $Mn_2O_3$, and $Mn_3O_4$) Slurry 1. Add 16.9 grams of manganese sulfate ($MnSO_4 \cdot H_2O$) to 900 ml of deionized water.
2. Adjust the pH to 12.5 with concentrated NaOH solution.
3. Aerate the solution for 1–10 hours to form a slurry.
4. Acidify the slurry to pH 1–2 with concentrated $H_2SO_4$.
5. Add sufficient deionized water to make one liter of slurry.

The oxidized slurry was dark and appeared as fine flocs of about 50–300 microns in size with high surface area under microscopic examination.

Part B: Preparation of 0.1M manganese oxides and 1 mM iron sulfate solution.

The solution was prepared in the same fashion as that in Part A above, except 0.28 grams of $FeSO_4 \cdot 7H_2O$ was added after the completion of step 4 and before step 5. (Note: Fe(II) was spontaneously oxidized to form Fe(III) in the presence of $MnO_2$, $Mn_2O_3$, and/or $Mn_3O_4$.)

Part C: Preparation of 0.3M manganese oxides ($MnO_2$, $Mn_2O_3$, and $Mn_3O_4$)

The solution was prepared in the same fashion as that in Part A, except 50.7 grams of $MnSO_4 \cdot H_2O$ is added in step 1.

Illustrative Embodiment I—REMOVAL OF NITRIC OXIDE

Test N-1

Two glass column reactors A and B, 36" high, 2" in diameter, which corresponded to the reaction chamber 101 of the appended drawing, were each filled with 1.5 liters of scrubbing slurry containing 0.1M of manganese oxides and 1 mM of iron sulfate prepared according to Part B above. Reactor A and B, each having a fine-bubble diffuser at the bottom, were connected in series. A gas stream containing 256 ppm by volume of nitric oxide (approximately 10% of which had been converted to nitric dioxide by the oxygen in the gas stream), 4% by volume of oxygen and balance of nitrogen was passed through the glass column reactors A and B at 500 ml/min. The pH of the slurry in Reactor A was 1.7 and that of Reactor B was 1.7. The test lasted for 12 hours.

Gas samples were collected at Exit of Reactor A and Exit of Reactor B. Little variation in both feed and off-gas composition was observed during the 12 hours. The concentration of $NO_x$ at Exit of Reactor A was 93 ppmv and the concentration was further reduced to 47 ppmv at Exit B, which amounts to a total removal of 81% of the $NO_x$ from the feed after passing through both reactor A and reactor B.

The nitrate content in the scrubbing slurry after 24 hours was analyzed to be 6.4 millimole after approximately 6.6 millimoles of NO was removed from the gas stream. No nitrite was detected. This data suggests that NO is stoichiometrically converted to nitrate in the slurry.

Both feed and treated gas samples were collected with Tedlar bags and analyzed immediately. All the tests and analyses were done around 25° C. $NO_x$ was analyzed with a Thermo Electron Model 10 Chemiluminescent detector. Aqueous nitrate was quantified by Dionex Model 2020i Anion Chromatograph.

Tests N-2, N-3, N-4, N-5, N-6, N-7, N-8, N-9 and N-10

The reaction was carried out in the same fashion as that for Test N-1 described above, except 0.1M manganese oxides slurry (without ferric sulfate) was used for Test N-2 and 0.3M manganese dioxide slurry (without ferric sulfate) was used for Tests N-3 through N-10. The gas flow rates, pH for the reactors and the % of $NO_x$ removed are listed in TABLE 1 below.

Illustrative Embodiment II—Removal of $SO_x$

Test S-1

The reaction was carried out in the same fashion as that for Test N-1 above, except that only reactor A was used. The reactor initially contained 1.5 liter of 0.3M manganese oxides slurry with a pH of 1.6. Inlet gas contained 450 ppmv $SO_2$ and 4% oxygen, the balance is nitrogen. The test with 1000 ml/minute flow rate was run for 24 hours. Gas samples were collected at Exit of Reactor A. Little variation in both feed and off-gas composition was observed during the 24 hours. The concentration of $SO_x$ at Exit of Reactor A was less than 1 ppmv, which amounts to a total removal of more than 99% of the $SO_x$ from the feed.

Test S-2

The reaction was carried out in the same fashion as that for Test S-1 above, except inlet gas contained 120 ppmv $SO_2$ and 4% oxygen, the balance is nitrogen. The test was run at 500 ml/minute flow rate for 24 hours. The gas flow rates, pH for the reactors and the % of $NO_x$ removed are listed in TABLE 2 below.

TABLE 1

Removal of Nitric Oxide by Manganese Dioxide Slurry (Two Reactors)

| Test #* | Gas Flow ml/min | pH A | pH B | $NO_x$ (ppmv) Feed | $NO_x$ (ppmv) A Exit | $NO_x$ (ppmv) B Exit | Removal % |
|---|---|---|---|---|---|---|---|
| N-1 | 500 | 1.7 | 1.7 | 256 | 93 | 47 | 81 |
| N-2 | 500 | 1.6 | — | 258 | 117 | — | — |
| N-3 | 500 | 1.6 | 1.6 | 240 | 127 | 89 | 63 |
| N-4 | 500 | 1.9 | 1.8 | 246 | 144 | 88 | 64 |
| N-5 | 500 | 1.9 | 1.8 | 162 | 99 | 68 | 58 |
| N-6 | 300 | 1.6 | 1.6 | 162 | 90 | 59 | 64 |
| N-7 | 500 | 2.1 | 1.1 | 87 | 47 | 27 | 69 |
| N-8 | 500 | 1.5 | 0.9 | 88 | 43 | 26 | 70 |
| N-9 | 1000 | 1.6 | 1.0 | 116 | 77 | 48 | 59 |
| N-10 | 1500 | 1.6 | 1.0 | 82 | 51 | 31 | 62 |

*Mn content was 0.1 M for Test #N-1 and #N-2, and 0.3 for other tests. Test #N-1 slurry also contained 1 mM ferric sulfate.

TABLE 2

Removal of Sulfur Dioxide by Manganese Dioxide Slurry (Single Reactor)

| Test # | Gas Flow ml/min | pH | $SO_2$ (ppmv) Feed | $SO_2$ (ppmv) A Exit | Removal % |
|---|---|---|---|---|---|
| S-1 | 1000 | 1.6 | 450 | <1 | >99 |
| S-2 | 500 | 1.6 | 120 | <1 | >99 |

Illustrative Embodiment III—Simultaneous Removal of $SO_x$ and $NO_x$

Test NS-1

The reaction is to be carried out in the same fashion as that for Test N-1 above with two slurry columns of reactor A and reactor B connected in series. The reactors initially will contain 1.5 liter of 0.3M manganese oxides slurry containing 1 mM iron sulfate with a pH of 1.6 at 25° C. The inlet gas will contain 400 ppmv $SO_2$, 200 ppmv NO, 4% oxygen, and balance of nitrogen. The test is to be conducted at 1000 ml/minute flow rate for 24 hours. Gas samples will be collected at Exit of Reactor B. The concentration of $SO_2$ at Exit of Reactor B would be approximately less than 1 ppmv and that of $NO_x$ would be approximately 50 ppmv.

Illustrative Embodiment III—Regeneration of manganese oxides

Spent manganese solution from Test N-2 was drained to a regeneration container which corresponded to the regeneration chamber 12 in the appended drawing. To one liter of said spent catalyst solution from Test N-2 which was a 0.1M manganese solution containing Mn(II) with pH 1.7, approximately 8 grams of NaOH was gradually added with rapid mixing, followed by aeration for 12 hours. During regeneration by air sparging, the high pH slurry (pH 12–13) gradually changed from light brown to almost black which indicated that the manganous (II) hydroxide was gradually changed to manganese oxides ($MnO_2$, $Mn_2O_3$, and $Mn_3O_4$). The regenerated slurry 11 was settled and approximately 0.5 liter clear supernatant was decanted. Water and sulfuric acid were then added to the settled slurry to bring the pH down to 1.7 and the volume to one liter. The acidified regenerated manganese oxides slurry 11 was then ready to be reused for scrubbing $NO_x$ and $SO_x$ containing gas stream.

The ranges and limitations provided in the instant specification and claims are those which are believed to particularly point out and distinctly claim the instant invention. It is, however, understood that other ranges and limitations that perform substantially the same function in substantially the same manner to obtain the same or substantially the same result are intended to be within the scope of the instant invention as defined by the instant specification and claims.

We claim:

1. A process for the oxidation of $SO_x$ and/or $NO_x$ contained in a gas stream, which process comprises:
   contacting said gas stream in a reaction chamber with an aqueous slurry comprising flocculent precipitates of $MnO_2$, $Mn_2O_3$, and $Mn_3O_4$, with said slurry having a pH value in the range of from about 0.5 to about 6.5, thereby forming (a) a spent solution comprising sulfate, nitrate manganous (II) ions and residual flocculent precipitates, and (b) a purified gas stream having diminished amounts of $SO_x$ and/or $NO_x$ over that in the gas stream;
   wherein said slurry is prepared by contacting a manganous salt, dissolved in an aqueous solution having a pH value from about 8.0 to about 13.5, with an oxygen-containing gaseous stream, thereby forming flocculent precipitates of $MnO_2$, $Mn_2O_3$, and $Mn_3O_4$, followed by adjusting the pH to said range of from about 0.5 to about 6.5.

2. A process for the oxidation of $SO_x$ and/or $NO_x$ contained in a gas stream, which process comprises:
   contacting said gas stream in a reaction chamber with an aqueous slurry comprising flocculent precipitates of $MnO_2$, $Mn_2O_3$, $Mn_3O_4$, and an iron salt, with said slurry having a pH value in the range of from about 0.5 to about 3.0, thereby forming (a) a spent solution comprising sulfate, nitrate, manganous (II) ions and iron and residual flocculent precipiates, (b) a purified gas stream having diminished amounts of $SO_x$ and/or $NO_x$ over that in the gas stream;

wherein said aqueous slurry comprises from about 0.01M to about 1M of manganese oxides and from about 0.1 to about 10 mM of iron;

wherein said slurry is prepared by contacting a manganous salt, dissolved in an aqueous solution having a pH value froth about 8.0 to about 13.5, with an oxygen-containing gaseous stream, thereby forming flocculent precipitates of $MnO_2$, $Mn_2O_3$ and $Mn_3O_4$, followed by adjusting the pH to said range of from about 0.5 to about 3.0 and subsequent addition of an iron salt.

3. The process of claim 1, wherein the spent solution is regenerated by
   (a) adjusting the pH of said spent solution to a range between about 8.0 and about 13.5;
   (b) passing an oxygen-containing gas stream therethrough to form flocculent precipitates of $MnO_2$, $Mn_2O_3$, and $Mn_3O_4$;
   (c) phase separating said regenerated flocculent precipitates, produced from step (b) above, from the remaining solution;
   (d) adjusting the pH of said separated flocculent precipitates by the addition of an acid to bring the pH to within a range of from about 0.5 to about 6.5; and
   (e) recycling at least a part of the product of (d) above to the reaction chamber.

4. The process of claim 2, wherein the spent solution is regenerated by
   (a) adjusting the pH of said spent solution to a range between about 8.0 and about 13.5;
   (b) passing an oxygen-containing gas stream therethrough to form flocculent precipitates of $MnO_2$, $Mn_2O_3$, $Mn_3O_4$, and Fe (III);
   (c) phase separating said regenerated flocculent precipitates, produced from step (b) above, from the remaining solution;
   (d) adjusting the pH of said separated flocculent precipitates by the addition of an acid to bring the pH to within a range of from about 0.5 to about 3.0; and
   (e) recycling at least a part of the product of (d) above to the reaction chamber.

5. The process of claim 3, wherein the temperature of the spent solution is maintained at from about 0° C. to about 200° C., the oxygen partial pressure of the $O_2$-containing gas stream is maintained at from about 0.1 psig to about 300 psig and total gas pressure thereof maintained at from about 1 psig to about 300 psig.

6. The process as described in claim 3, wherein the temperature of the spent solution is maintained at from about 20° C. to about 150° C., the oxygen partial pressure of the oxygen-containing gas stream is maintained at from about 1 psig to about 15 psig and total gas pressure thereof maintained at from about 5 psig to about 100 psig.

7. The process as described in claim 3, wherein the pH of said flocculent precipitates in step (d) is adjusted to a range of from about 1.0 to about 2.5.

8. The process as described in claim 3, wherein the adjusted pH of said spent solution in (a) is from about 9.5 to about 12.5.

9. The process as described in claim 3, wherein said spent solution is regenerated in the absence of added heat.

10. A process for simultaneous removal of $SO_x$ and $NO_x$ contained in a waste gas stream, which process comprises:

(i) contacting said waste gas stream in a reaction chamber with an aqueous slurry comprising flocculent precipitates of $MnO_2$, $Mn_2O_3$, $Mn_3O_4$, and Fe(III), wherein said aqueous slurry comprises from about 0.01M to about 1M of manganese oxides and from about 0.1 to about 10 mM of iron;

wherein said slurry has a pH value from about 1.0 to about 2.5 and has a temperature in a range from about 50° C. to about 95° C., wherein the pressure of the waste gas stream is from about 0.05 psig to about 10 psig, wherein the temperature of the waste gas is in a range from about 60° C. to about 140° C., thereby forming (a) a spent solution comprising $SO_4^=$, $NO_3^-$, manganous (II) ion iron and residual flocculent precipitates, and (b) a purified gas stream having diminished amounts of $SO_x$ and $NO_x$ over that in the waste gas streams;

wherein said slurry comprising flocculent precipitates of $MnO_2$, $Mn_2O_3$, $Mn_3O_4$, and Fe(III) are prepared by passing an oxygen-containing gaseous stream through a manganous salt containing an aqueous solution having a pH value from about 9.5 to about 12.5 in the absence of added heat, the temperature of the aqueous solution is maintained at from about 20° C. to about 150° C., the oxygen partial pressure of the oxygen-containing gaseous stream is maintained at from about 1 to about 15 psig and total gas pressure of the air is maintained at from about 5 psig to about 100 psig, thereby forming a slurry comprising flocculent precipitates of $MnO_2$, $Mn_2O_3$, and $Mn_3O_4$, followed by (a) adjusting the pH to of the slurry to a range from about 1.0 to about 2.5 and (b) adding iron containing salt to the slurry; and (ii) regenerating said spent solution by:
   (a) adjusting the pH of said spent solution to a range between about 9.5 and 12.5
   (b) passing oxygen-containing gaseous stream through the solution from step (a) in the absence of added heat, the temperature of the solution is maintained at from about 20° C. to about 150° C., the oxygen partial pressure of the oxygen-containing gaseous stream is maintained at from about 1 to about 15 psig and total gas pressure thereof is maintained at from about 5 psig to about 100 psig, to produce a mixture comprising (a) regenerated flocculent precipitates comprising $MnO_2$, $Mn_2O_3$, $Mn_3O_4$, Fe(III) and (b) remaining spent solution;
   (c) phase separating said regenerated fine flocculent precipitates produced from step (b) above, from the remaining spent solution;
   (d) adjusting the pH of said separated regenerated fine flocculent precipitates from (c) by the addition of an acid to bring the pH to within a range between about 1.0 and about 2.5; and
(iii) recycle the product of (d) to the reaction chamber.

11. The process as described in claim 10, wherein the remaining spent solution from (c) is sent to a disposal well.

12. The process as described in claim 10, wherein salts of the nitrate and sulfate in the remaining spent solution from (c) are recovered.

13. The process as described in claim 10, wherein CaO or Ca(OH)$_2$ is added to the remaining spent solution to form a caustic solution comprising OH.

14. The process as described in claim 13, wherein at least a part of the caustic solution comprising OH is used for pH adjustment in step (i) and/or step (ii) (a).

* * * * *